(12) United States Patent
Kingston (10) Patent No.: US 11,397,916 B2
(45) Date of Patent: Jul. 26, 2022

(54) RFID LOCATION SYSTEM AND ASSOCIATED METHODS FOR A PRODUCT DISPENSING SYSTEM

(71) Applicant: THE COCA-COLA COMPANY, Atlanta, GA (US)

(72) Inventor: Benjamin John Kingston, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 275 days.

(21) Appl. No.: 16/631,658

(22) PCT Filed: Jul. 16, 2018

(86) PCT No.: PCT/US2018/042309
§ 371 (c)(1),
(2) Date: Jan. 16, 2020

(87) PCT Pub. No.: WO2019/018296
PCT Pub. Date: Jan. 24, 2019

(65) Prior Publication Data
US 2020/0184410 A1 Jun. 11, 2020

Related U.S. Application Data

(60) Provisional application No. 62/534,104, filed on Jul. 18, 2017.

(51) Int. Cl.
*G06Q 10/08* (2012.01)
*F25D 11/00* (2006.01)
(Continued)

(52) U.S. Cl.
CPC ........... *G06Q 10/087* (2013.01); *F25D 11/00* (2013.01); *F25D 31/002* (2013.01);
(Continued)

(58) Field of Classification Search
CPC .. G06Q 10/087; G06Q 20/18; G06Q 30/0185; G06Q 20/203; G06Q 20/3224;
(Continued)

(56) References Cited

U.S. PATENT DOCUMENTS

2009/0069949 A1* 3/2009 Carpenter ............ B67D 1/0041
222/144.5
2009/0166415 A1 7/2009 Braun et al.
(Continued)

FOREIGN PATENT DOCUMENTS

KR 20140096689 A1 8/2014

OTHER PUBLICATIONS

Extended European Search Report for Application No. 18834731.4 dated Mar. 5, 2021.
(Continued)

*Primary Examiner* — Russell S Glass
(74) *Attorney, Agent, or Firm* — Meunier Carlin & Curfman LLC (57) ABSTRACT

A machine and process for providing consumer products may include a set of positions configured to contain consumer products or containers in which ingredients are used to form consumer products. The consumer products or containers may include radiofrequency identification (RFID) tags. A set of antennas, where at least one antenna is disposed at each position, may be configured to output and receive RF signals. A transceiver may be in electrical communication with the antennas, and be configured to generate the RF signals. A processor may be in communication with the transceiver, and be programmed to (i) receive RFID signals from the RFID tags at the set of positions, and (ii) identify locations of the RFID tags to determine that corresponding consumer products or containers of ingredients are in correct positions.

18 Claims, 8 Drawing Sheets

(51) Int. Cl.
*F25D 31/00* (2006.01)
*G06K 7/10* (2006.01)
*G06K 19/077* (2006.01)
*G06Q 20/18* (2012.01)
*G06Q 30/00* (2012.01)

(52) U.S. Cl.
CPC ..... *G06K 7/10217* (2013.01); *G06K 7/10366* (2013.01); *G06K 19/07758* (2013.01); *G06Q 20/18* (2013.01); *G06Q 30/0185* (2013.01)

(58) Field of Classification Search
CPC ... G06Q 20/3278; F25D 11/00; F25D 31/002; G06K 7/10217; G06K 7/10366; G06K 19/07758; G06K 19/0723; G06K 7/10009; G06K 7/10356; G07G 1/009
USPC .......................................................... 705/28
See application file for complete search history.

(56) References Cited

U.S. PATENT DOCUMENTS

| | | |
|---|---|---|
| 2010/0147417 A1 | 6/2010 | Dorney |
| 2015/0169910 A1* | 6/2015 | Koch ................. G06K 7/10415 340/10.1 |
| 2016/0003930 A1* | 1/2016 | Swope ............... G06K 7/10475 342/368 |
| 2016/0063287 A1* | 3/2016 | Birrer ................ G06K 7/10316 340/10.1 |

OTHER PUBLICATIONS

International Search Report and Written Opinion issued by the International Searching Authority (ISA/US) in PCT Application No. PCT/US2018/042309 dated Nov. 29, 2018. 10 pages.

* cited by examiner

RFID LOCATION SYSTEM AND ASSOCIATED METHODS FOR A PRODUCT DISPENSING SYSTEM

RELATED APPLICATIONS

This application is a national stage application filed under 35 U.S.C. § 371 of PCT/US2018/042309 on Jul. 16, 2018, which claims priority to U.S. provisional patent application Ser. No. 62/534,104 filed on Jul. 18, 2017, the contents of which are hereby incorporated by reference in their entireties.

FIELD OF THE INVENTION

The present invention relates to a beverage dispenser and, more specifically, to locating positions of ingredient packages or containers and/or other product packaging in beverage dispensers using radio frequency identification (RFID) tags.

BACKGROUND OF THE INVENTION

Beverage and other product dispensers are used in a variety of venues. As understood in the art, beverage dispensers often include ingredients that enable users to dispense desired beverages. Some dispensers enable combinations of ingredients and/or flavors to allow consumers the ability to create desired custom beverages. In addition to providing a more specific beverage that a user prefers, these dispensers may be used for marketing and attracting consumers to venues that house the dispensers.

Technology for beverage dispensers and other dispensers or machines is also improving. For example, the ability to customize a beverage has been developed over the years by providing selectable ingredients and flavors for consumers to select in purchasing a beverage. As demand for customized beverages continues to rise, logistical concerns, such as servicing the dispensers and replacing ingredients and flavors, increase. Different ingredients and flavors may find different levels of demand in different venues. Unpredictable patterns for how long an ingredient or flavor will last before becoming empty provide useful feedback to the operators and/or servicers of the dispensers. However, the patterns present unique difficulties with servicing.

An operator of a beverage dispenser may track varying timelines for each ingredient and/or flavor so that each ingredient and flavor may be timely replaced to avoid an ingredient or flavor becoming empty. However, what typically occurs now is that the machine registers an empty status, and the operator replaces the ingredient or beverage.

In replacing the ingredients and/or flavor in packages or containers, the operator typically identifies which ingredient(s) and/or flavor(s) are to be replaced, and then removes the empty packaging and places or inserts a new, full ingredient and/or flavor in the respective position(s) in the dispenser. Operator error in replacing the ingredients and/or flavors (or beverages in the case of vending machines or coolers), however, can and does occur when the operator incorrectly locates and replaces one ingredient or flavor with another. For example, an operator may accidentally replace a cherry flavoring container in a grape flavoring container position. Such a mistake can contaminate lines of the dispenser, which then requires an operator to clean and possibly decontaminate the lines.

Current dispensers may utilize radiofrequency identification (RFID) systems to identify packaging of ingredients and/or flavors, full or empty, as the packaging is inserted or removed from locations of the dispenser. The packaging may have an RFID label adhered thereto, and may be programmed with information including ingredient type, remaining volume, expiration date, and other useful data.

Existing dispensers may utilize an RFID reader in conjunction with antennas to read the ingredient package's tag data. In order to know locations of the particular ingredients and/or flavors, an array of antennas are used to sense individual tag positions. However, to avoid cross-reading or incorrect location identification of the ingredient and/or flavoring packaging, a minimal amount of RF power is used to avoid cross-reading of the RFID chips on packages or containers in neighboring locations from one being read. Additional factors, such as RFID tag sensitivity, antenna gain variances, physical separation variation between RFID tags and antennas, sensitivity as a function of frequency of operation, and other factors create difficulties and unreliability in the reading the RFID tags. Hence, as a result of reading errors, dispenser owners or operators have been reluctant to use or rely on such RFID reading technology, and, thus, continue to have faults that existed without the use of RFID systems.

BRIEF SUMMARY OF THE INVENTION

Dispenser machines or dispensers ("machines") that provide consumer products, such as consumable products (e.g., beverages, foods), to consumers may be configured to identify positions of product ingredients and/or flavors in packaging or containers, products, or other dispensable items by reading RFID tags attached thereto. In identifying the ingredients and/or flavors, or products themselves, in allocated positions, such as slots or bins, a certain power level (e.g., maximum power level) of an RF signal may be directed to locations in which packaging or products to read the RFID tags attached thereto. By applying the certain RF power levels, such as a maximum power level RF signal or at least a power level that causes cross-reading, to the RFID tags along with a sorting process, a read success rate for reading the RFID tags may be improved over conventional techniques that generally include minimum RF power levels to avoid cross-reads. The RFID tags may return RFID signals having an RSSI value in response to the RF signal that is read by the machine. The machine may sort position records of product ingredients and/or flavors or products themselves based on the RSSI values.

One embodiment of a process for identifying positions of containers or products in a machine may include generating an RF signal at a certain power level. The RF signal may be output to each position of a set of positions in which the containers are positioned. RFID signals produced by the RFID tags in response to being energized by the RF signal may be read and recorded into a list including entries for each read RFID signal and sorted on a location-by-location basis. Correct positions of each RFID tag may thereby be determined.

Another embodiment of a method for identifying positions in which of radiofrequency identification (RFID) tags affixed to consumer products or containers in which ingredients used to form consumer products by a machine that provides consumer products to consumers are located may include generating a radiofrequency (RF) signal at a certain power level. The power level may be a maximum power level in an embodiment. The RF signal may be output to each position of a set of positions at which the consumer products or containers are positioned. RFID signals produced by the RFID tags may be read in response to being energized by the RF signal, where the RFID signals of different tags including (i) a unique product identifier and (ii) a unique RFID tag identifier. The RFID signals may also include data representative of a product identifier. The RFID signals have a signal strength that enables measurement of received signal strength indicator (RSSI) values. Entries may be recorded into a list for each read RFID signal. The entries may include (i) a corresponding unique RFID tag identifier, (ii) a corresponding position identifier, and (iii) a corresponding measured RSSI value. The entries may optionally include a product identifier. A determination as to correct positions of each RFID tag may be made by (i) identifying a highest RSSI value in the list, (ii) assigning the corresponding RFID tag identifier to a position based on the corresponding position identifier, (iii) removing, from the list, additional entries including the corresponding RFID tag identifier, and (iv) repeating identifying, assigning, and removing until each of the RFID tags are assigned to a position.

One embodiment of a machine for providing consumer products may include a set of positions configured to contain consumer products or containers in which ingredients are used to form consumer products. The consumer products or containers may include radiofrequency identification (RFID) tags. A set of antennas, where at least one antenna is disposed at each position, may be configured to output and receive RF signals. A transceiver may be in electrical communication with the antennas, and be configured to generate the RF signals. A processor may be in communication with the transceiver, and be programmed to (i) receive RFID signals from the RFID tags at the set of positions, and (ii) identify locations of the RFID tags to determine that corresponding consumer products or containers of ingredients are in correct positions.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
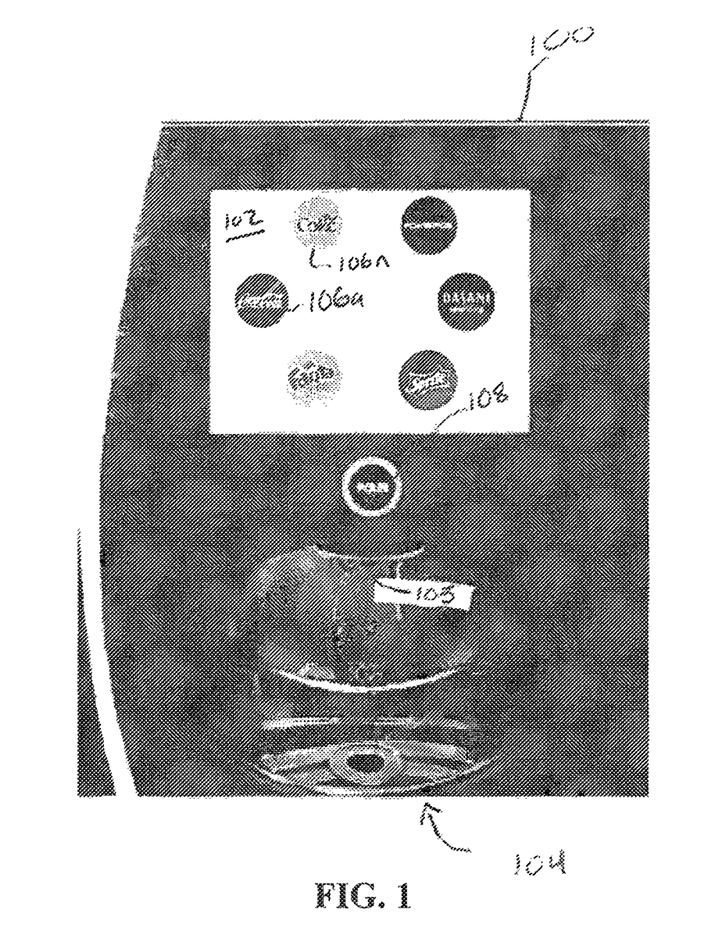
FIG. 1 is an illustration of an illustrative machine that dispenses consumer products, such as beverages.

With regard to FIG. 1, an illustration of an illustrative machine 100 that dispenses consumer products, such as beverages, to consumers is shown. The machine 100 may be a dispenser, but may alternatively be a cooler, vending machine, or any other machine configured to provide consumer products for consumers to purchase or otherwise obtain, as further described herein. In an embodiment, the beverages may be soft-drinks, fruit beverages, still beverages, water, hot beverages (e.g., coffee), and so on. The machine 100 may be placed in a venue, such as, but not limited to, retail stores, grocery stores, restaurants, malls, sports venues, airports, walkways, or any other public or private location at which a consumer may purchase a consumer product, such as a beverage, from the machine 100.

The machine 100 may include a user interface 102, a cavity or other region 104 in which a beverage may be dispensed via a nozzle 105, icons 106a-106n (collectively 106) indicating brand and/or flavor options to a user, and a button 108 for a user to press to control dispensing of the beverage. It should be understood that the machine 100 is illustrative and that a wide range of alternate configurations may be utilized.

Figure 2A:
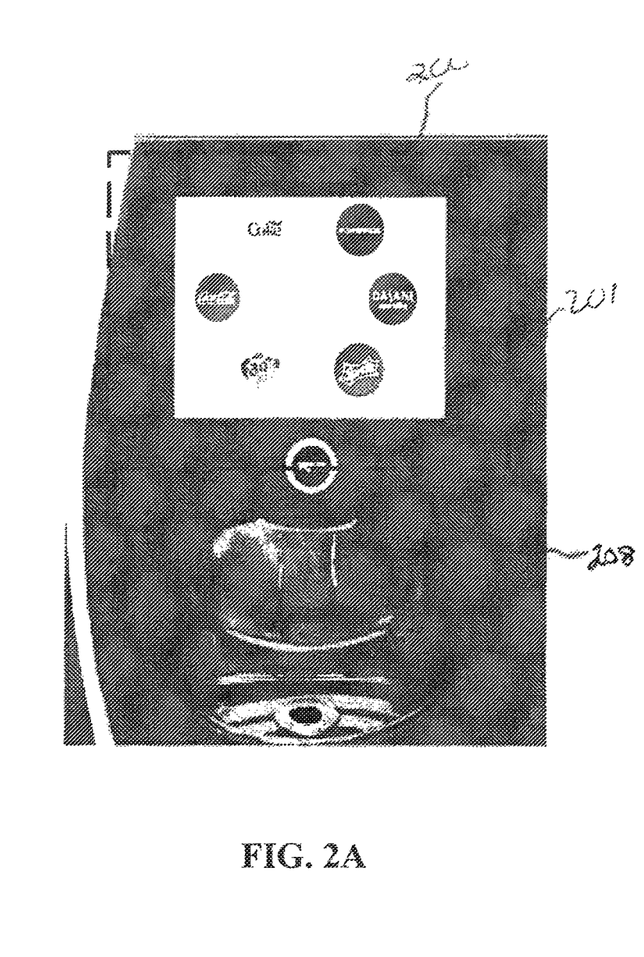
FIGS. 2A-2F are illustrations of an illustrative machine inclusive of a set of positions along with operational signaling used to dispense consumer products and verify correct positioning thereof.
Figure 2B:
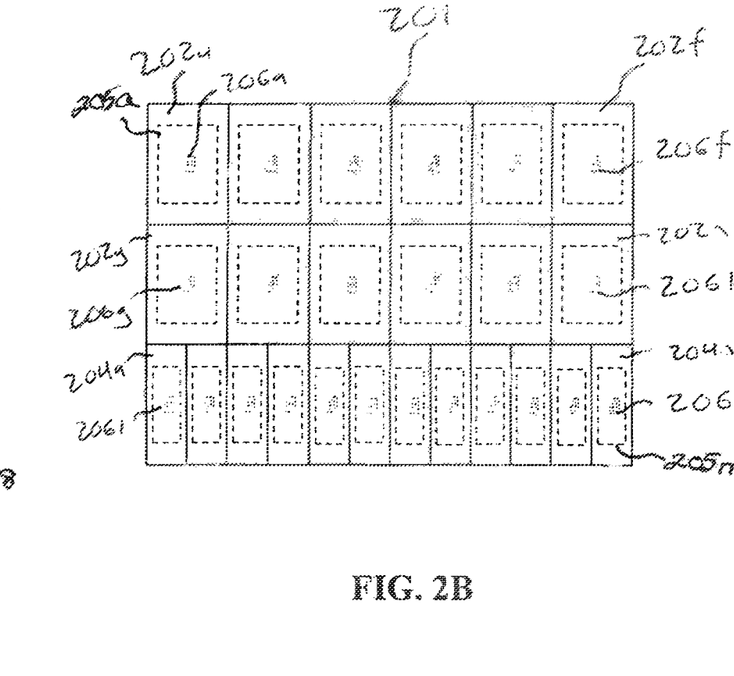
Figure 2C:
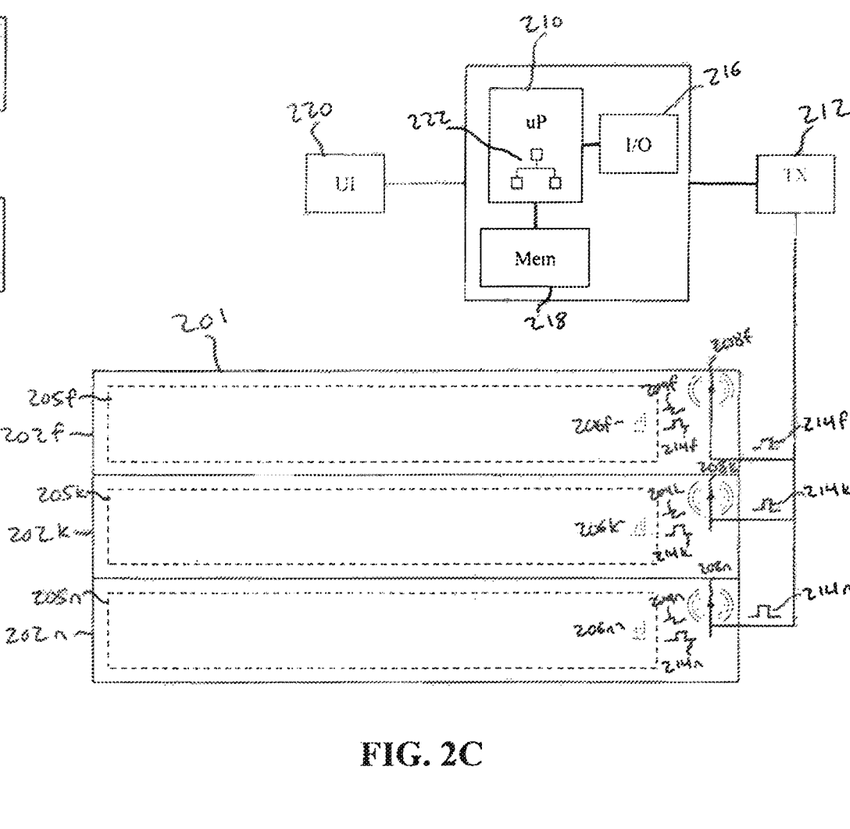

With regard to FIGS. 2A-2C, illustrations of a machine 200 inclusive of a set of positions 201 used to dispense consumer products are shown. The set of positions 200a may be slots or other defined locations internal to the machine 200. For dispensers, the locations typically have tubing that enables fluid to be drawn from containers and dispensed from nozzles. FIG. 2B is an illustration that shows the set of positions 201 and includes a first set of positions 202a-202n (collectively 202) and a second set of positions 204a-204n (collectively 204). In one embodiment, the set of positions 201 may include three rows of twelve positions, where the first two rows are the first set of positions 202 and the third row is the second set of positions of 204. It should be understood that alternative configurations of the positions 201 may be utilized.

In one embodiment, the first set of positions 202 may be configured to contain a first set of ingredients, such as macro-ingredients. In one embodiment, the second set of positions 204 may be configured to contain a second set of ingredients, such as micro-ingredients. Macro-ingredients and micro-ingredients may be housed in containers 205a-205n (collectively 205) (shown dashed in FIGS. 2B-2C) such as, but not limited to, pouches, bags, and/or boxes. The containers 205 may include radiofrequency identification (RFID) tags 206a-206n (collectively 206) attached thereto. The RFID tags 206 may be active or passive tags. It should be understood that alternative types of tags or technologies that provide for equivalent functionality of identification may alternatively be utilized.

There are a few types of beverage ingredients, including micro-ingredients, macro-ingredients, and a middle level of ingredients. Micro ingredients are generally acids and flavors that are highly concentrated and are able to produce a beverage using a high ratio (e.g., 150:1) of water or other beverage ingredient to the micro ingredient. Macro ingredients also include acids and flavors that are less concentrated and are used at a lower ratio (e.g., 5:1) of water or other beverage ingredient to the macro ingredient. Other mid-level ingredients may be used in concentration ratios (e.g., 50:1) that are between the micro- and macro-ingredients.

Because the micro-ingredients can be used in such high ratio concentrations, the micro-ingredients may be stored in containers, such as half-liter pouches, and still provide for a sufficient number beverage dispenses in a typical food outlet, such as a restaurant, of an operator of the dispenser 200. Macro-ingredients are stored in containers that are much larger, such as 2.5, 3, or 5 gallon bags. As a result, in one embodiment, the first set of positions 202 may be configured to be larger than the second set of positions 204. In other embodiments, the first set of positions 202 and second set of positions 204 may be substantially the same size. Still yet, other configurations of the dispenser 200 may position the sets of positions 202 and 204 outside of the dispenser 200, such as in a separate cabinet or even in a separate room, and receive the fluids via lines that extend through a cabinet or wall, for example.

In operation, an operator may open and/or remove a front panel 208 of the machine 200 to access the set of positions 201. The operator may further install, maintain, or replace the macro-ingredients and/or micro-ingredients.

With regard to FIG. 2C, a right side elevation view of the set of positions 201 is shown. Position 202f, position 202n, and position 204n are positions depicted on a right side of the set of positions 201 of FIG. 2B. RFID tags 206f, 206k, and 206n are shown to be respectively configured on the containers 205f, 205k, and 205n. In one embodiment, the operator may insert or install the containers 205f, 205k, and 205n inclusive of the ingredients and/or flavors so that the RFID tags 206f, 206k, and 206n are configured to be in a rear portion of the set of positions 200b. Other positioning of the RFID tags 206f, 206k, and 206n may be used, as well.

The set of positions 201 may have antennas 208a-208n (collectively 208) disposed to direct or communicate RF signals into respective positions 202 and 204. Antennas 208f, 208k, and 208n are shown to be configured to be longitudinally aligned with a rear portion of the set of positions 201. However, other alignments of the antennas 208 are functionally possible, as well. The antennas 208, in response to receiving RF signals 209f, 209k, and 209n, may communicate data 214a-214n (collectively 214) to a transceiver 212 for processing, as further described hereinbelow.

A processing unit 210 may be in electrical communication with the transceiver 212. The processing unit 210 may be in communication with an input output (I/O) unit 216 and memory 218. The I/O unit 216 may be configured to communicate with the transceiver 212 and with a user interface 220 that enables a user to select and pour beverages, as previously described. The processing unit 210 and user interface 222 may also enable an operator to receive messages, such as error messages, notifications, and alerts during servicing, as further described herein.

The processing unit 210 may be implemented using one or more processors, one or more cores (e.g., a multi-core processor), or may be part of one or more application specific integrated circuits (ASICs) and/or digital signal processors (DSPs). Alternatively, the processing unit 210 may be formed of analog or other circuitry. The processing unit 210 may be configured to implement any of the processes described herein, and may be implemented using hardware, software, firmware, or combinations thereof. The processing unit 210 may be configured to execute software 222 that perform certain functions, as further described herein.

Figure 2D:
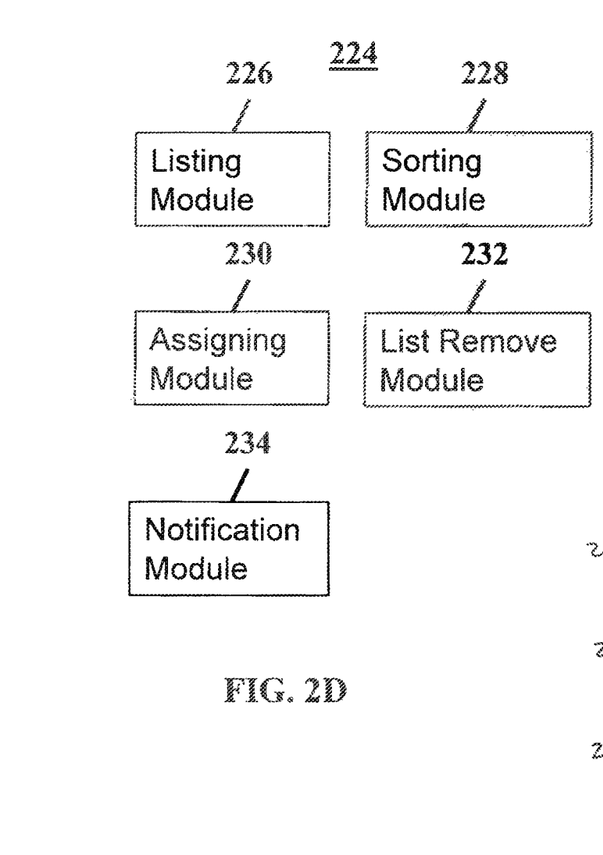

With regard to FIG. 2D, a block diagram inclusive of illustrative software modules 224 that may form part of the software 222 of FIG. 2C to enable sorting of values in a list representative of RFID tags in positions is shown. The modules 224 may include a listing module 226 for adding values to a list and a sorting module 228 for sorting values in the list. An assigning module 230 may include assigning RFID tags to respective positions 202 and 204. In assigning RFID tags, and consequently packaging or products, to respective positions 202, one embodiment may include identifying a highest RSSI value in association with a position from amongst common RFID tag IDs and assigning the corresponding RFID tag and associated data to the position. Additionally, a list remove module 232 may include removing additional entries from the list corresponding to the RFID tag most recently assigned to a position, thereby eliminating potential for misassignments and improving computing and memory efficiency. In some embodiments, the modules 224 may include a notification module 234 that supports a user interface, such as a touchscreen, keypads, buttons, or any other user interface elements, configured to provide notifications in the condition of any error or feedback milestone. For example, the notification module 234 may provide notifications in response to, but not limited to, an RFID tag placed in an incorrect position. One of ordinary skill in the art will appreciate that notifications may correspond to a variety of events including, but not limited to, warning a user of an error and providing diagnostic information, as well as others. An example of the modules 224 in operation is provided in further detail hereinbelow.

One embodiment of a method of operation may include reading the RFID tags 206 with the antennas 208. When RF power is applied by the RF signals 209 to the RFID tags 206, the RFID tags 206 may return a response signal having a signal strength that can be measured as a receive signal strength indicator (RSSI) value by the transceiver 212 and/or processing unit 210. The RSSI value is a measure of signal strength of the RFID tag's 206 response signal. The processing unit 210 may utilize the RSSI values as indicators as to which RFID tags 206 are closest to respective antennas 208. However, RSSI values may be received from multiple RFID tags, such as RFID tags 206f and 206k, to a single antenna 208f due to multiple RFID tags being activated by an RF signal, such as RF signal 209f, for example.

As an example, the RFID tag 206f having RFID signal 214f is measured with a strongest RSSI value by antenna 208f that is positioned closest with the position of RFID tag 206f. Lower power RFID signal 214k may also be received by the antenna 208f.

The processing unit 210 may be configured to be significantly less dependent on (i) variability of RFID tags 206 and (ii) distance from antennas 208 to tags 206. Additionally, the processing unit 210 may drive an RF signal at a constant power, and may not need to specifically set the RF signal within a window for each position of the set of positions 200b, such as an example provided in FIG. 2F and described in further detail hereinbelow. In one embodiment, the constant power may be a maximum power of the RF signal. By transmitting the RF signal at a certain power level (e.g., above a threshold power level) or full power, variability of measurement of RSSI of RFID signals may be reduced through a processing process, as further described herein. As understood in the art, a range of alternative configurations may be utilized for aligning the antennas 208 with the tags 206.

Figure 2E:
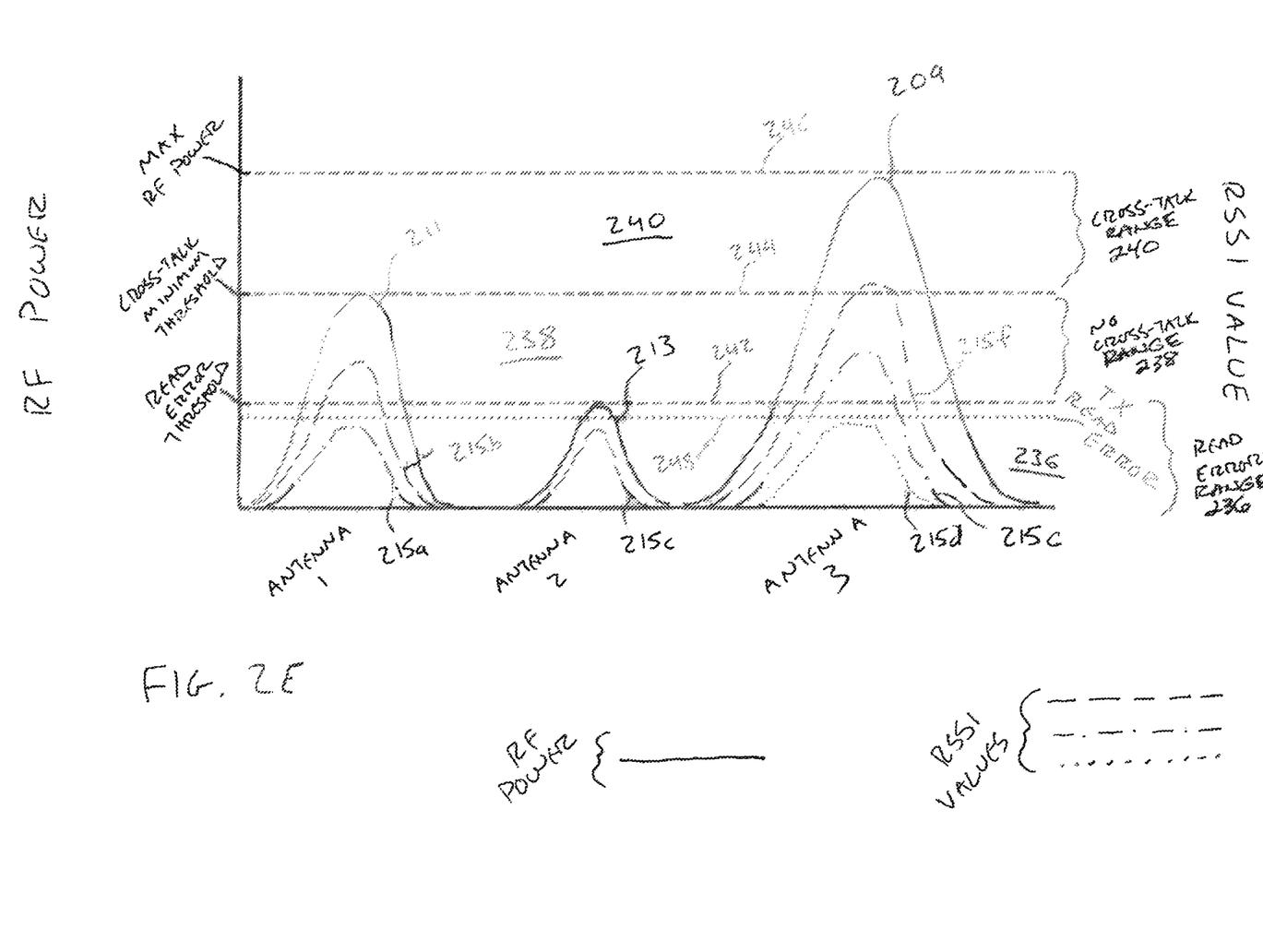
Figure 2F:
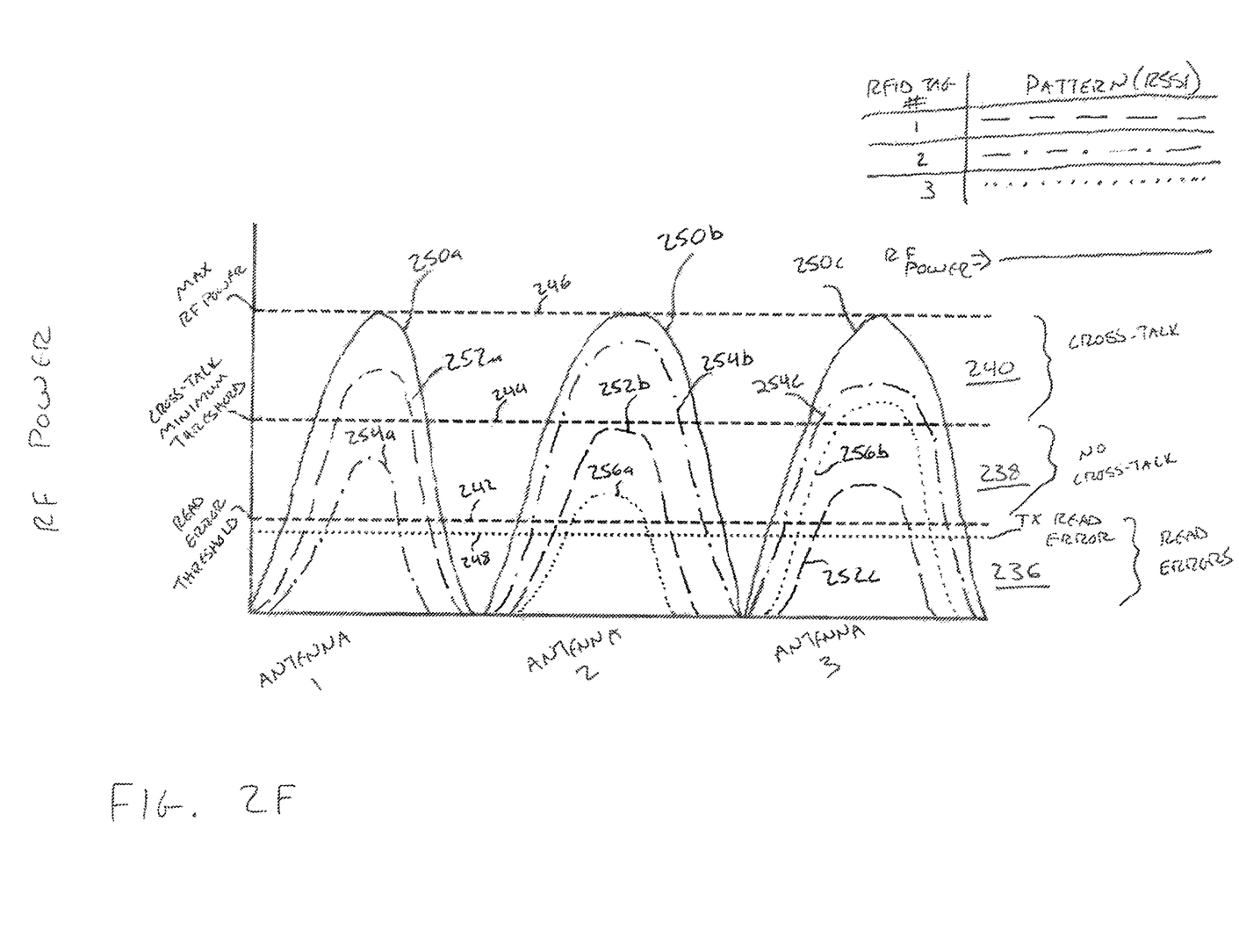

With regard to FIGS. 2E and 2F, graphs inclusive of illustrative RF signals transmitted in RF power level ranges are shown. Specifically, FIG. 2E shows a conventional RF signal 211 (i.e., output signal to an RFID tag that produces RFID signals 215a and 215b), RF signal 213 that causes RFID tags to produce RFID signal 215c that would cause a read error due to the signal strength being too low, and RF signal 209 that results in the RFID tags producing RFID signals 215d, 215e, and 215f.

FIG. 2F represents signals that may result from an illustrative scenario using a configuration of a dispenser. The RF power level ranges that provide an indication as to whether an RF receiver will not be able to read, only read one, or read multiple RFID signals may include (i) a read error range 236, (ii) a no cross-talk range 238, and (iii) a cross-talk range 240. More specifically, the read error range 236 may be a range in which the RF power level is below a read error threshold 242 that may cause read errors from RFID tags due to receiving RFID signals with insufficient power. The no cross-talk range 238 may be a range in which the RF power level provides for no read errors due to a read RF signal being below a power level that creates cross-talk from RFID tags 206 in adjacent positions and above the read error range 238. The no cross-talk range 238 extends above the read error threshold 242 and below a cross-talk minimum threshold 244. The cross-talk range 240 may include RF signals 209 above the cross-talk minimum threshold 244 and below a max RF power level 246. RF signal 209 intentionally causes RFID signals 215*d*, 215*e*, and 215*f* with power levels in the cross-talk range 240 that result in cross-talk from RFID tags 206 of adjacent positions measured by at least one antenna 208.

One of skill in the art will understand that current practices target the no cross-talk range 238 between the read error threshold 242 and the cross-talk minimum threshold 244 for outputting RF signal 211 to avoid errors in assigning positions of RFID tags (and corresponding containers and products) caused by cross-talk. As a result, an RSSI value 215*a* adjacent to antenna 1 may be below a transceiver read error threshold 248 and not read while RSSI value 215*b* is returned by an RFID tag in a position corresponding to antenna 1. Additionally, an example of an RF signal with RF power in the read error range 236 is shown with an RFID signal 215*c* with a returned RSSI value below the transceiver read error threshold 248, which results in a read error.

Figure 5:
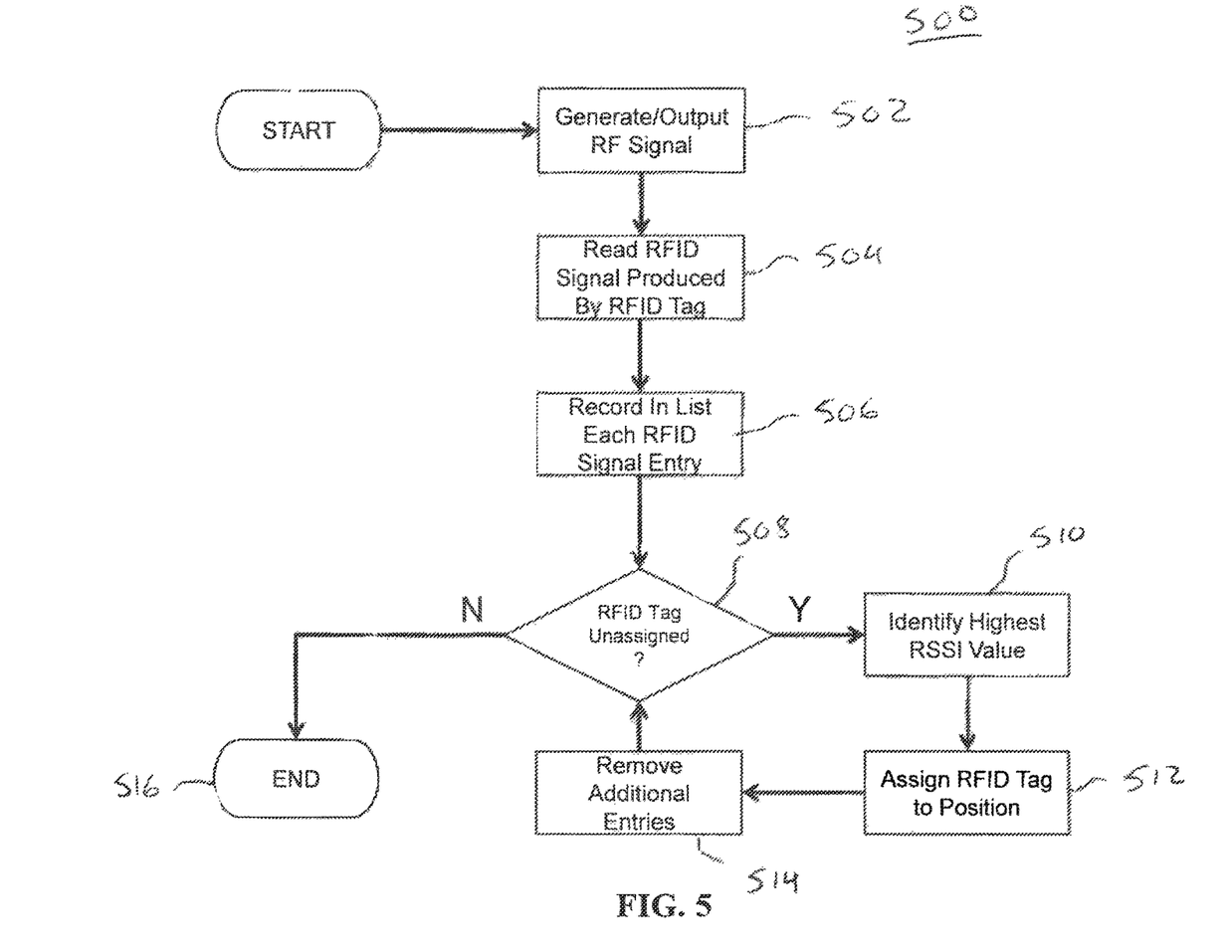
FIG. 5 is an illustration of an illustrative flow diagram of a process executable by a machine that identifies positions of radiofrequency identification tags, such as positions in the machine, associated with ingredient containers or products.

As a result of using the new algorithm described in FIG. 5, cross-talk from different RFID tags has no, or limited, problems with previous algorithms used to identify locations of RFID tags. As shown, the RF signal 209 (FIG. 2D) and RF signals 250*a*-250*c* (collectively 250) have power levels above the cross-talk minimum threshold 244. The RF signal 209 may be transmitted at any power level in the cross-talk range 240. Even if at least one RFID signal, such as RFID signal 215*d*, has an RSSI value below the transceiver read error threshold 248, RF signal 209 having an RF power level in the cross-talk range 240 will likely result in cross-talk reads from RFID tags, for example, as shown by RFID signals 215*e* and 215*f* of FIG. 2E and RFID signals 252*a*-252*c* (collectively 252), RFID signals 254*a*-254*c* (collectively 254), and RFID signals 256*a*-256*b* (collectively 256) of FIG. 2F. However, as presented in FIGS. 2D and 5, and described below, cross-talk errors may be avoided using the sorting module 238 and the assigning module 230 in a sorting algorithm that utilizes RSSI values as a basis.

In operation, for example, at each antenna, such as antennas 1, 2, and 3 of FIG. 2F, the processing unit 210 may inventory each of the RFID tags 206 that returns an RFID signal based on an RSSI value. An example of hypothetical data including columns for each antenna (e.g. ANTENNA 1) and entries for tag numbers (e.g. Tag 2) and RSSI values (e.g. (47)) read at the antenna in the same column, is shown in TABLE 1:

TABLE 1

| ANTENNA 1 | ANTENNA 2 | ANTENNA 3 |
|---|---|---|
| Tag 1 (83) | Tag 2 (96) | Tag 2 (81) |
| Tag 2 (47) | Tag 1 (72) | Tag 3 (78) |
|  | Tag 3 (42) | Tag 1 (43) |

Data from the RFID tags 206 may be read and written into a list by listing module 226. An example of the list is shown in LIST 1:

LIST 1 MASTER LIST

Tag 1 (83)
Tag 2 (47)
Tag 2 (96)
Tag 1 (72)
Tag 3 (42)
Tag 2 (81)
Tag 3 (78)
Tag 1 (43)

Each entry in the list may include, but is not limited to, a unique product identifier corresponding with the product contained in the position, an RSSI value, a unique RFID tag identifier, and a position identifier indicating the position at which the RSSI value was gathered. After the set of positions 200*b* has been inventoried, the sorting module 238 may sort the list by RSSI values, for example, by placing highest RSSI values first. An example of a sorted LIST 1 is shown in LIST 2:

LIST 2 MASTER LIST

Tag 2 (96)
Tag 1 (83)
Tag 2 (81)
Tag 3 (78)
Tag 1 (72)
Tag 2 (47)
Tag 1 (43)
Tag 3 (42)

Beginning with a highest RSSI value, the assigning module 230 may assign the corresponding unique RFID tag identifier to the corresponding position identifier. An example of an assigned position is shown in TABLE 2:

TABLE 2

| POSITION 1 | POSITION 2 | POSITION 3 |
|---|---|---|
|  | Tag 2 (96) |  |

Additional instances of the unique RFID tag identifier may be removed from the list, by the list remove module 232, to avoid cross-measurement assignments from occurring. An example of a list including removed instances of the unique RFID tag identifier is shown in LIST 3:

LIST 3 MASTER LIST

Tag 2 (96) = P2
Tag 1 (83)
~~Tag 2 (81)~~
Tag 3 (78)
Tag 1 (72)
~~Tag 2 (47)~~
Tag 1 (43)
Tag 3 (42)

A new highest RSSI value may be identified in the list, and the process of assigning corresponding unique RFID tag identifiers to corresponding position identifiers may be followed until all unique RFID tag identifiers have been either assigned to positions or removed. Additionally, an embodiment of the process is described in further detail hereinbelow with regard to FIG. 5. An example of a recurring process of the assigning module 230 and list remove module 232 on LIST 3 until completion is sequentially shown in TABLES 3-4 and LISTS 4-5:

TABLE 3

| POSITION 1 | POSITION 2 | POSITION 3 |
|---|---|---|
| Tag 1 (83) | Tag 2 (96) | |

LIST 4 MASTER LIST

Tag 2 (96) = P2
Tag 1 (83) = P1
~~Tag 2 (81)~~
Tag 3 (78)
~~Tag 1 (72)~~
~~Tag 2 (47)~~
~~Tag 1 (43)~~
Tag 3 (42)

TABLE 4

| POSITION 1 | POSITION 2 | POSITION 3 |
|---|---|---|
| Tag 1 (83) | Tag 2 (96) | Tag 3 (78) |

LIST 5 MASTER LIST

Tag 2 (96) = P2
Tag 1 (83) = P1
~~Tag 2 (81)~~
Tag 3 (78) = P3
~~Tag 1 (72)~~
~~Tag 2 (47)~~
~~Tag 1 (43)~~
~~Tag 3 (42)~~

Figure 3A:
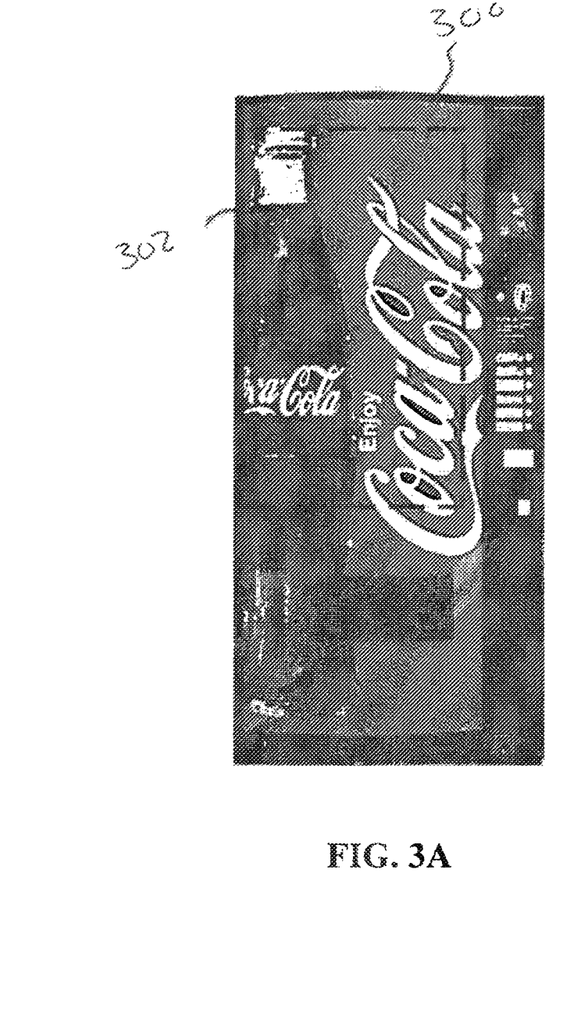
FIGS. 3A and 3B are illustrations of an illustrative vending machine inclusive of a set of positions and RFID sensors used to dispense consumer products.
Figure 3B:
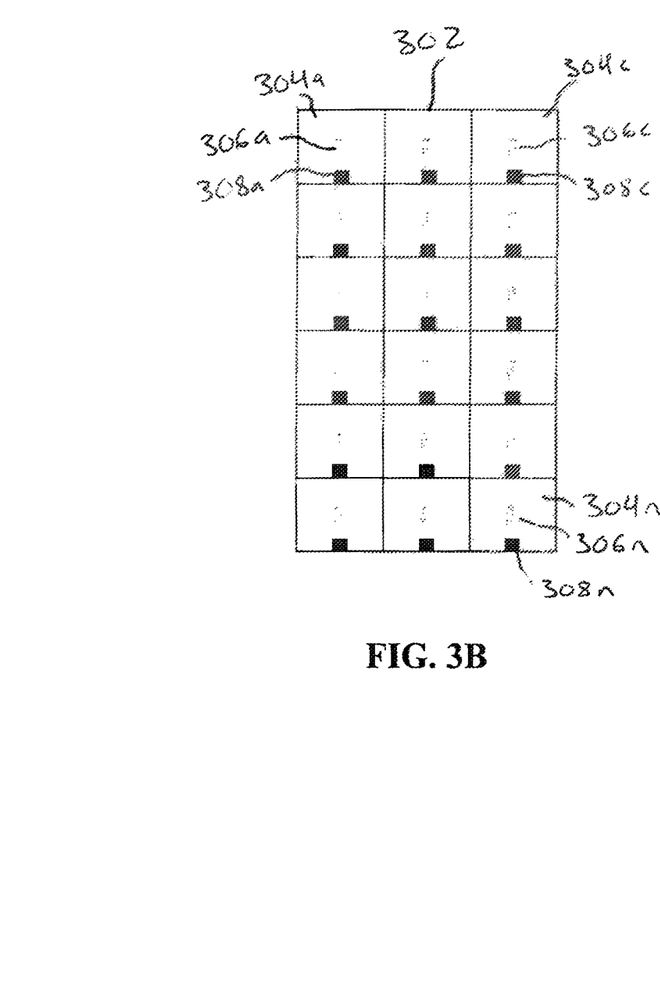

With regard to FIGS. 3A and 3B, an illustration of an illustrative vending machine 300 that vends or dispenses consumer products, in this case packaged beverages, inclusive of a set of positions 302 is shown. The set of positions 302 is shown in more detail in FIG. 3B. The set of positions 302 may include positions 304a and 304n (collectively 304) that are used to store and release products for vending to consumers. The positions 304 may alternatively set up as vertical columns. The positions 304 may contain consumer products that include RFID tags 306a-306n (collectively 306) that are affixed to or integrated with the consumer products. As the consumer products are installed, removed, or purchased, sensors 308a-308n (collectively 308) may sense installation, storage, and/or passage of the RFID tags 306 on the products. The sensors 308 are shown to be mounted on the bottom of the positions 304, but could be mounted elsewhere so long as the alternative positions provide for a high-degree of sensing reliability. An inventory may be established by a processing unit, such as the processing unit 210 of FIG. 2C, and be updated in response to the sensors 308 sensing movement and/or storage of the products with the RFID tags 306. The process of identifying positions 304 of the RFID tags 306 may be the same or similar to the process referred to hereinabove with reference to FIGS. 2A-2C. A variety of other functions may additionally be performed.

Figure 4A:
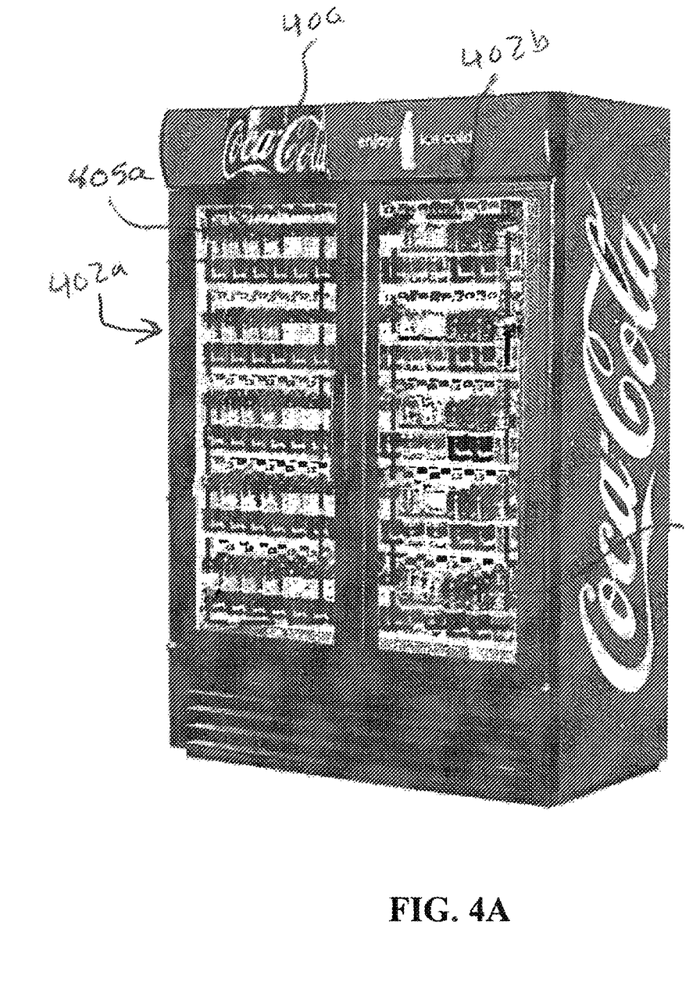
FIGS. 4A and 4B are illustrations of an illustrative cooler inclusive of a set of positions and RFID sensors that contain consumer products for access by users.
Figure 4B:
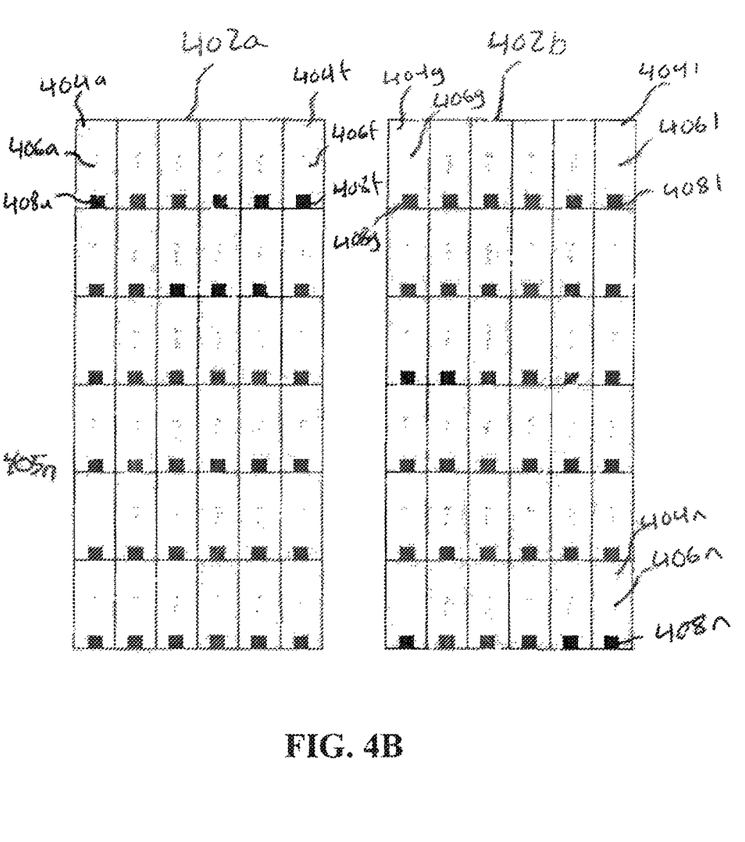

With regard to FIGS. 4A and 4B, an illustration of an illustrative cooler 400 that contains consumer products inclusive of a set of positions 402a and 402b is shown. The set of positions 402a and 402b may operate substantially as one set of positions or, alternatively, may be treated, by a processing unit, as two separate sets of positions. The set of positions 402b and 402c may include individual positions 404a-404n (collectively 404) configured to store consumer products 405a-405n (collectively 405) with RFID tags 406a-406b (collectively 406) that are affixed or integrated with the products. Sensors 408a-408n (collectively 408) may be used to sense the RFID tags 406 associated with the consumer products 405, and a processing unit may be used to collect and process data read from the RFID tags 406.

With regard to the set of positions referred to hereinabove relating to FIGS. 2A-2C, 3A-3B, and 4A-4B, the processing unit 210 (or a processing unit operating in any of the other dispenser, vending machine, or cooler) may be configured to communicate with an electronic device, such as the user interface or mobile device of an operator, in response to an incorrect consumer product being placed into a position designated for a different consumer product. In one embodiment, an error message may be communicated to the electronic device to notify the operator that a product or ingredient is positioned incorrectly. In another embodiment, the error message may be communicated to a separate user interface (e.g., mobile device). One of ordinary skill in the art will appreciate that there are many ways to communicate an error message to the operator, including lights or other visual indicators, audible indicator, or otherwise. A user and/or operator may store a particular unique product identifier that is allowable in each unique position identifier. The processing unit 210 may determine if a particular unique product identifier that has been placed in a position is allowable according to the stored particular unique product identifiers assigned to that unique position identifier by the operator.

Additionally, RFID tags may include data representative of at least one of ingredient type, expiration date of the consumer products, manufacturing plant information, status (e.g., temperature) of the consumer product, and a consumer product quantity gauge (e.g., fluid ounces remaining, number of beverage pours remaining, etc.). One of ordinary skill in the art will appreciate that further diagnostic data may be included in RFID signals transmitted from the RFID tags to the processing unit for diagnostic purposes. In one embodiment, the RFID tags may be writable and may receive updated consumer product quantities to replace the consumer product quantity gauge. The updated consumer product quantity may be delivered by an external counter in electrical communication with at least one of the processing unit 210 and the RFID tags. Additionally, the processing unit may communicate to an electronic device for an operator to view diagnostic data, such as, but not limited to, that inventory levels, notifications (e.g., a consumer product is experiencing a malfunction during dispensing), alerts (e.g., a consumer product has been placed in an incorrect position), or otherwise. One of ordinary skill in the art will further appreciate that additional data may be communicated through RFID signals to the processing unit and that the processing unit may communicate any amount of that data to a user and/or operator.

With regard to FIG. 5, a flow diagram of an illustrative process 500 executable by a machine that identifies positions of RFID tags is shown. The process 500 may be configured to identify positions in which RFID tags are positioned and installed in the machine to provide consumer products to consumers are located. The process 500 may start at step 502, where a processor may be programmed to cause a transceiver (or the transceiver may operate independently) to generate and output an RF signal. The RF signal may be generated at a certain power level. In one embodiment, the power level may be a maximum level of the transceiver, thereby simplifying the process and preventing or minimizing false readings. The RF signal may be output to antennas in serial or in parallel at each position of a set of positions at which (i) the consumer products are positioned or (ii) the containers are positioned depending on the machine (e.g., dispenser, vending, cooler, etc.).

The RF signal may cause an RFID tag on a container or consumer product to return a signal inclusive of an RSSI level. The RSSI level may be measured, and the processor may read the RFID signal produced by the RFID tag along with the RSSI level at step 504. In one embodiment, reading the RFID signals produced by the RFID tags in response to being energized by the RF signal may include reading data within the RFID signal. The RFID signal of different tags may include data that includes a unique product identifier and a unique RFID tag identifier.

The processor may record each of the RFID signals into a list with each entry in the list corresponding to a separate RFID signal entry at step 506. In one embodiment, recording entries into the list may include recording entries inclusive of data corresponding to the RFID tag. The entries may include a corresponding unique RFID tag identifier, a corresponding position identifier, and a corresponding product identifier, a corresponding measured RSSI value. In one embodiment, the list may be sorted by RSSI value.

After determining that the list includes RFID tags that are not assigned to a correct position at step 508, the processor may identify a highest RSSI value in the list at step 510. The processor may then assign the corresponding RFID tag identifier to a position based on the corresponding position identifier at step 512. At step 514, the processor may remove from the list additional entries including the corresponding RFID tag identifier. Returning to step 508, the processor may again determine if remaining RFID tags in the list are unassigned. In a condition that RFID tags remain unassigned, the processor may repeat the identifying, assigning, and removing steps 510, 512, and 514, respectively, until all RFID tags are assigned to a position. In a condition that the processor determines that no RFID tags remain unassigned, the process 500 may end at step 516.

In one embodiment, a set of positions may contain at least two consumer products and corresponding RFID tags in each position. In such a case, the processor is to be configured to support such a fulfillment desire by an operator.

One embodiment of the machine in accordance with the principles described herein may include a multiplexer for routing/reading RF signals to/from antennas.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A method for identifying positions in which of radiofrequency identification (RFID) tags affixed to consumer products or containers in which ingredients used to form consumer products by a machine that provides consumer products to consumers are located, said method comprising:
   generating a radiofrequency (RF) signal at a certain power level;
   outputting the RF signal to each position of a set of positions at which the consumer products or containers are positioned;
   reading RFID signals produced by the RFID tags in response to being energized by the RF signal, the RFID signals of different tags including (i) a unique product identifier and (ii) a unique RFID tag identifier, the RFID signals having a signal strength that enables measurement of received signal strength indicator (RSSI) values;
   recording, into a list, entries for each read RFID signal, the entries including (i) a corresponding unique RFID tag identifier, (ii) a corresponding position identifier, and (iii) a corresponding measured RSSI value; and
   determining correct positions of each RFID tag by:
      identifying a highest RSSI value in the list;
      assigning the corresponding RFID tag identifier to a position based on the corresponding position identifier;
      removing, from the list, additional entries including the corresponding RFID tag identifier; and
      repeating identifying, assigning, and removing until each of the RFID tags are assigned to a position.

2. The method according to claim 1, further comprising sorting the list by measured RSSI value.

3. The method according to claim 1, wherein outputting the RF signal to each position includes outputting the RF signal to each position located inside the machine.

4. The method according to claim 3, further comprising:
   storing unique product identifiers allowable to be placed in respective positions; and
   determining whether the unique product identifier corresponding with the RFID tag identifier assigned to the position is the unique product identifier allowable in the position.

5. The method according to claim 4, wherein, if the unique product identifier corresponding with the RFID tag is determined to not match the unique product identifier allowable in the position, communicating an error message to an operator.

6. The method according to claim 1, wherein generating the RF signal at the certain power level includes generating the RF signal at a maximum power level.

7. The method according to claim 1, wherein reading the RFID signals includes reading the RFID signals including diagnostic data of the consumer product.

8. The method according to claim 7, further comprising communicating a message to an operator representative of the diagnostic data.

9. The method according to claim 1, wherein reading the RFID signal further includes reading the RFID signal further including at least one of ingredient type, expiration date of the consumer product, manufacturing plant information, status of consumer product, and a consumer product quantity gage.

10. The method according to claim 9, further comprising writing to the RFID tag.

11. The method according to claim 10, wherein the writing to the RFID tag includes updating, by a counter configured to be external to the RFID tag, the consumer product quantity gage.

12. A machine for providing consumer products, said machine comprising:
   a set of positions configured to contain consumer products or containers in which ingredients used to form consumer products, the consumer products or containers including radiofrequency identification (RFID) tags;
   a set of antennas, at least one antenna disposed at each position, and configured to output and receive RF signals, the RF signals at a power level above a cross-talk minimum threshold;
   a transceiver in electrical communication with the antennas, and configured to generate the RF signals; and
   a processor in communication with said transceiver, and programmed to:
      receive RFID signals from the RFID tags at the set of positions;
      identify locations of the RFID tags to determine that corresponding consumer products or containers of ingredients are in correct positions;
      read RFID signals produced by the RFID tags in response to being energized by the RF signal, the RFID signals of different tags including (i) a unique product identifier and (ii) a unique RFID tag identifier, the RFID signals having a signal strength that enables measurement of received signal strength indicator (RSSI) values; and
      record, into a list, entries for each read RFID signal, the entries including (i) a corresponding unique RFID tag identifier, (ii) a corresponding position identifier, and (iii) a corresponding measured RSSI value;
      determine correct positions of each RFID tag by being programmed to:
         identify a highest RSSI value in the list;
         assign the corresponding RFID tag identifier to a position based on the corresponding position identifier;
         remove, from the list, additional entries including the corresponding RFID tag identifier; and
         repeat identifying, assigning, and removing until each of the RFID tags are assigned to a position.

13. The machine according to claim 12, wherein the machine is one of a beverage dispenser, a cooler, and a vending machine.

14. The machine according to claim 12, wherein said processor is further programmed to sort the list by measured RSSI value.

15. The machine according to claim 12, wherein the consumer products are beverages or the ingredients are used to formulate and produce beverages by the machine.

16. The machine according to claim 12, wherein said processor is further programmed to prevent operation of the machine in response to determining that a consumer product or container is placed in an incorrect position as designated by an operator based on reading the RFID signals.

17. The machine according to claim 12, further comprising a user interface; and wherein said processor is further programmed to communicate messages for display on a user interface for an operator in response to reading the RFID signals.

18. The machine according to claim 12, wherein a first position is configured to contain a first consumer product and corresponding RFID tag and a second position is configured to contain a second consumer product and corresponding RFID tag.

* * * * *